Dec. 15, 1942.                F. M. CLARK                2,305,580
                           ELECTRIC CAPACITOR
                           Filed Aug. 9, 1941
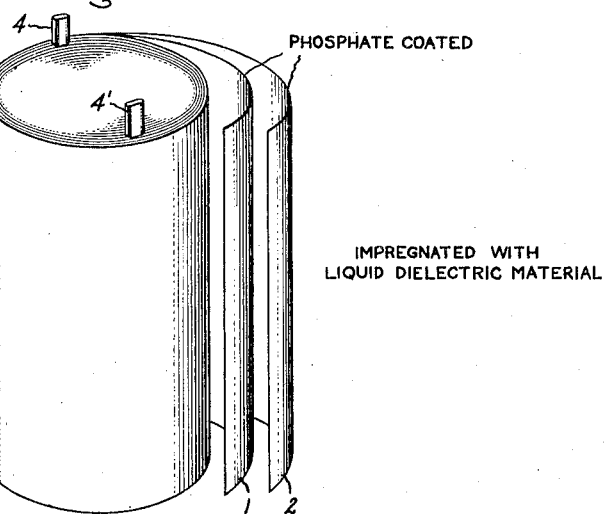
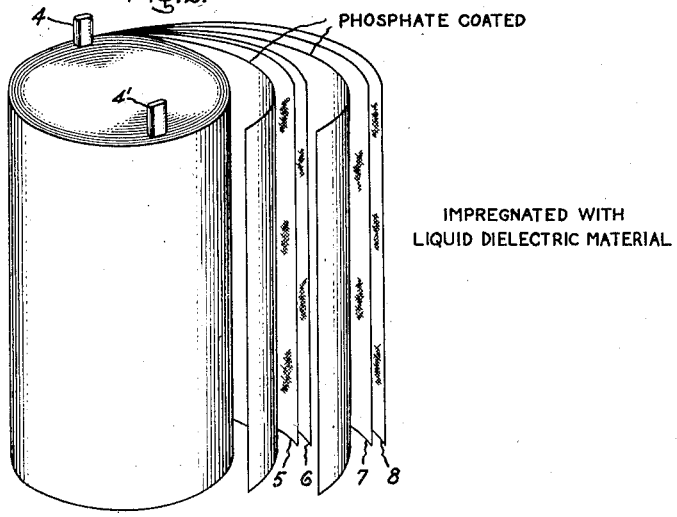
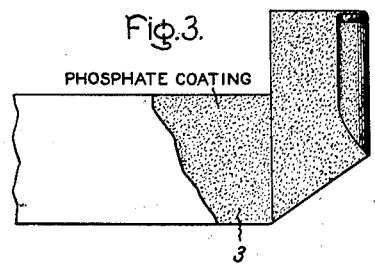
Inventor:
Frank M. Clark,
by Harry E. Dunham
His Attorney.

Patented Dec. 15, 1942

2,305,580

UNITED STATES PATENT OFFICE 2,305,580

ELECTRIC CAPACITOR

Frank M. Clark, Pittsfield, Mass., assignor to General Electric Company, a corporation of New York Application August 9, 1941, Serial No. 406,205

4 Claims. (Cl. 175—41)

This invention relates to electric capacitors, and its main object is to provide dielectric elements therefor which consist at least in part of non-conducting phosphate of a metal as, for example, an iron or zinc phosphate.

One of the objects of my invention is to provide electrical capacitors which will embody high electrical capacity per unit of physical bulk. A further object is to provide dielectric elements for electrical capacitors which are characterized in operation by low energy loss, thus permitting continuous operation without excessive temperature rise.

The advantages of my invention will become apparent from the following description taken in connection with the accompanying drawing, in which Fig. 1 shows somewhat conventionally capacitor armatures separated by one or more phosphate dielectric elements; Fig. 2 shows the latter associated with another dielectric element; and Fig. 3 shows structural details in a phosphate-coated capacitor armature.

A capacitor fundamentally employs closely juxtaposed armatures of conducting material which ordinarily consist of metal foil or other form of thin metal. The armatures commonly are separated by one or more thin sheets of dielectric material, commonly consisting of paper. In exceptional instances, as in electrolytic capacitors, the dielectric element is constituted by a film or coating of oxide formed on the surface of one or both of the armatures.

In accordance with the present invention, a coating of film of a phosphate of the foundation metal is chemically formed on a capacitor armature. This film is characterized by having a high degree of dielectric continuity, freedom from porosity and freedom from conducting areas, and unexpectedly favorable dielectric properties as will hereinafter appear.

In producing a phosphate-coated electrode in accordance with my invention, I may use any electrode metal which is capable of forming a continuous dielectric film on its surface by chemical reaction with phosphoric acid or an inorganic phosphate. Zinc is of practical utility since it can be obtained commercially as foil of the desired thinness. Zinc foil as thin as .0003" to .0005" is suitable. Iron also is suitable. In some cases, iron, zinc, or other suitable metal may be electro-deposited or otherwise coated on a foundation of metal not otherwise so favorable. Copper may be thus coated and converted into foil.

A metal to be phosphate-coated is treated with a boiling aqueous solution containing 25 grams of phosphoric acid and 1.5 grams of manganese dioxide per liter, for example, by simple immersion of the metal in the solution or by passing an elongated article, such as a strip of thin foil, through a reaction bath. The length of the immersion time is dependent upon the type of film desired and may vary from five to sixty minutes. Another aqueous treating solution which has been found to be of utility consists of ammonium phosphate $(NH_4)HPO_4$. Preferably, an aqueous solution containing 10 per cent concentration of the salt at a solution temperature of about 95 to 100° C. is employed. Zinc foil immersed as described in such a solution for five minutes has been found to be satisfactorily coated with an inorganic dielectric layer.

In some instances it has been found possible to accelerate the chemical reactions involved by the adition of from one to two per cent of zinc nitrate or a small trace (not over five-tenths per cent) of colloidal copper.

A further illustration of a suitable reaction solution is one made from a phosphate mixture obtainable in the market as "Parko mixture." This solution consists of phosphoric acid and an acid phosphate to which a small amount of zinc nitrate is added. The reaction solution is maintained at a pH value of 2 to 2.5. When zinc or iron foil is immersed in this solution at a temperature from 90° C. to 100° C., chemical reaction occurs. The metal surface is coated with the desired dielectric film after approximately five minutes of immersion.

After a capacitor armature has been provided with a phosphate dielectric film using one of the reaction solutions described, it is washed with water and dried. When treating armature foil for the usual rolled type of capacitor, it has been found most convenient to perform the various operations by one continuous passage of the foil in an endless strip through first a reaction bath, then through a scrubber containing water where the reacting solution is removed, and finally through an oven where the foil is dried by contact with a stream of hot, dry air.

The insulated strip of foil or the like is wound into rolls for later fabrication in a capacitor assembly, as will be described hereinafter.

Referring to the drawing, as shown in Figs. 1 and 3, the capacitor assembly may consist of juxtaposed insulated foils 1, 2 assembled in close contact without any separate spacing element, the reaction film 3 (Fig. 3) on the surface of the electrodes constituting a dielectric medium. Although a single coated foil is theoretically sufficient for a low voltage field to furnish the required dielectric element in combination with an uncoated foil, two juxtaposed coated foils are desirable from a practical standpoint because of the great difficulty in eliminating all traces of "weak spots" or areas of dielectric imperfections from the insulation formed on the foil surface.

Capacitors in which the dielectric consists solely of insulating phosphate film can be operated with impressed potentials in a range of voltages up to 110 volts. Such capacitors after assembly are dried under vacuum at 100 to 125° C. or higher, and are impregnated with a dielectric material to eliminate air films, the presence of which reduces electrical capacity. While various liquids and liquefied waxes or resins may be used, I prefer liquid pentachlor diphenyl as an impregnant. Capacitors impregnated with pentachlor diphenyl are characterized by a breakdown limit of approximately 350 volts and a power factor of less than .5 per cent at room temperature.

The electric terminals 4, 4' may be made, as shown in Fig. 3, by folding an end portion of the armatures or by other known constructions. In Fig. 3 the phosphate coating 3 (indicating by stippling) is shown as partly removed (for the sake of contrast) from the foundation metal. Electric contact may be made to the terminals 4, 4' even though they are coated with a thin layer of phosphate as it is easy to break through the phosphate with a pressure contact device. Other known contact constructions may be used if care is exercised to remove or break through the insulating phosphate film where required to make good electrical connection.

In some cases, as shown in Fig. 2, I prefer to employ capacitors having phosphate-coated armatures prepared in accordance with this invention, separated from each other not only by the phosphate films, but also by one or more layers 7, 8 of some other dielectric material. For example, standard capacitor kraft paper tissue, preferably .0003" to .0005" in thickness, may be used. Other separators may be employed such, for example, as a resinous material or a plastic such as cellulose acetate. Suitable resins are alkyd resins, polymerized styrene, or phenol formaldehyde resin. In Fig. 2, paired sheets 5, 6 and 7, 8 of such dielectric material are illustrated although a different number or a single sheet may be used.

After assembly, such capacitors, with one or more spacing sheets, are dried at 100° C. to 120° C. under a vacuum, preferably lower than 500 microns of mercury pressure and thereupon are impregnated with a dielectrical liquid or solid as above indicated. Finally, they are mounted in a sealed container, as well understood.

Capacitors of untreated (normal surface) foil, when spaced with but one sheet of capacitor tissue, are of little practical value because of unavoidable inherent defects in the paper spacer. Such defects include "weak spots" or "shorts" due to the presence of conducting particles (probably minute carbon or metal particles) which cause breakdown of the capacitor under the application of but a few volts. In capacitors containing armatures coated with an insulating phosphate, the effect of such "weak spots" in the paper is eliminated or reduced because of the presence of the insulating film on the electrode surface which prevents electrical contact of the metallic conductor and the conducting material of the "weak spot" in the paper.

A capacitor containing only one sheet of the capacitor tissue thus becomes for the first time of practical value. A capacitor provided with the combination of a phosphate film and a single sheet of paper after drying and impregnation with pentachlor diphenyl, has a breakdown value in the range of 500 volts and is fully capable of use on commercial alternating current circuits at 220 or 330 volts. Such a capacitor is characterized by an electrical capacity of one microfarad for each five to six square feet of active electrode area. This is a reduction of about 20 to 30 per cent from the electrode area normally required for one microfarad of electrical capacity in capacitors of similar voltage rating.

It is in the dielectric loss characteristic that another unexpected and highly favorable property of capacitors incorporating my new type of insulated electrodes is observed. Normally, capacitors with electrodes of aluminum, tin, or zinc, spaced by a dielectric composed of multiple kraft capacitor tissue (.0003" to .001" per sheet) after vacuum drying and impregnation with pentachlor diphenyl are characterized with a power factor of .3 to .4 per cent measured at 25° C. under a 60 cycle voltage at a stress of from 300 to 400 volts per mil.

With the increased electrical capacity per unit of electrode area, such as is possessed by capacitors using my improved coated armatures, it is desirable even more than ordinarily that the electrical losses should be reduced. The smaller surface area of the capacitor housing from which the heat generated in operation must be dissipated, coupled with an even moderately high power factor, would result in overheating of the capacitor in service. Unexpectedly, my improved capacitor possesses the desired low power factor, that is, low energy loss.

Capacitors utilizing foil or plate electrodes insulated with my new insulating film, as already described, and separated by one sheet of capacitor tissue, are characterized by a power factor of .22 per cent and in some instances as low as .20 per cent when tested at 25° C. under a 60 cycle voltage stress in the range of 300 to 400 volts. This decrease in electrical losses is believed to be attributable to a more intimate contact which is obtained between the impregnated dielectric and the electrode plate or foil as a result of the presence of the insulating phosphate layer chemically formed thereon as described.

When two sheets of capacitor tissue supplement the phosphate film, the benefits of my invention are obtained in some measure and in addition the breakdown value of the capacitor is correspondingly increased. Breakdown voltages in the range of 1800 volts to 2600 volts may be realized.

What I claim as new and desire to secure by Letters Patent of the United States is:

1. An electric capacitor comprising cooperating, closely juxtaposed armatures, a film of phosphate of a metal chosen from the group consisting of iron and zinc functioning as a dielectric element between said armatures and a second dielectric material filling voids between said armatures.

2. An electric capacitor comprising cooperating, closely juxtaposed armatures, a film of zinc phosphate interposed between said armatures and functioning as a dielectric element, and a liquid dielectric material filling voids between said armatures.

3. An electric capacitor comprising cooperating armatures of zinc foil having thereon an adherent superficial layer of zinc phosphate, paper interposed between said armatures, and a dielectric material filling voids between said armatures.

4. An electric capacitor comprising juxtaposed armatures, at least one of which is provided with an adherent non-porous coating of phosphate of a metal chosen from the group consisting of iron or zinc, said phosphate having dielectric properties, paper interposed between said armatures, and a liquid dielectric material impregnating said paper and filling voids between said armatures, said capacitor being adapted for operation under voltage stress of 300 to 400 volts per mil of dielectric with a power factor of a fraction of one per cent.

FRANK M. CLARK.